US009411796B2

(12) United States Patent
George et al.

(10) Patent No.: US 9,411,796 B2
(45) Date of Patent: Aug. 9, 2016

(54) SMOOTHING PATHS IN A GRAPHICAL INTERFACE GENERATED BY DRAWING INPUTS

(71) Applicant: Adobe Systems Incorporated, San Jose, CA (US)

(72) Inventors: Paul Andrew George, Hillsborough, CA (US); Bruce Allen Hodge, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 25 days.

(21) Appl. No.: 14/018,142

(22) Filed: Sep. 4, 2013

(65) Prior Publication Data

US 2015/0067462 A1 Mar. 5, 2015

(51) Int. Cl.
*G06K 9/40* (2006.01)
*G06F 17/24* (2006.01)
*G06T 11/20* (2006.01)
*G06F 3/0488* (2013.01)

(52) U.S. Cl.
CPC .............. *G06F 17/242* (2013.01); *G06T 11/20* (2013.01); *G06F 3/04883* (2013.01)

(58) Field of Classification Search
CPC .... G06F 17/242; G06F 3/04883; G06T 11/20
See application file for complete search history.

(56) References Cited

U.S. PATENT DOCUMENTS

| 5,471,571 | A * | 11/1995 | Smith | G06F 3/04892 345/654 |
| 5,570,111 | A * | 10/1996 | Barrett | G06F 3/0383 345/157 |
| 6,304,677 | B1 * | 10/2001 | Schuster | 382/264 |
| 6,909,430 | B2 * | 6/2005 | Dresevic et al. | 345/443 |
| 7,697,002 | B2 * | 4/2010 | McCall et al. | 345/467 |
| 2010/0261526 | A1 * | 10/2010 | Anderson | G06F 3/017 463/31 |
| 2011/0298807 | A1 * | 12/2011 | Kim | 345/442 |
| 2012/0232854 | A1 * | 9/2012 | Muller-Fischer et al. | 703/1 |
| 2013/0086516 | A1 * | 4/2013 | Rodgers | G06T 13/80 715/799 |
| 2013/0132051 | A1 * | 5/2013 | Hadap | G06T 11/203 703/6 |

OTHER PUBLICATIONS

Yannick Thiel, Karan Singh, Ravin Balakrishnan, Elasticurves: exploiting stroke dynamics and inertia for the real-time neatening of sketched 2D curves, Proceedings of the 24th annual ACM symposium on User interface software and technology, Oct. 16-19, 2011, Santa Barbara, California, USA.*
Roger Allen, Dynadraw Interpretation based on Paul Haeberli's 1989 Dynadraw and Scribbler by Mr. Doob, 2010, source available: http://jsfiddle.net/rogerallen/LCbpz/ Accessed Aug. 26, 2015.*

* cited by examiner

*Primary Examiner* — Bhavesh Mehta
*Assistant Examiner* — Ian Lemieux
(74) *Attorney, Agent, or Firm* — Kilpatrick Townsend & Stockton LLP

(57) ABSTRACT

Systems and methods are provided for smoothing paths in a graphical interface generated by drawing inputs. One embodiment involves determining a value of a motion attribute associated with a drawing input to a graphical interface. The embodiment also involves modifying a value of a smoothing parameter for a smoothing operation based on the determined value of the motion attribute. The smoothing parameter at least partially determines an amount of smoothing performed by a smoothing operation on input points generated by the drawing input. The embodiment also involves generating a path for rendering in the graphical interface. The path can be generated by applying the smoothing operation to the input points using the determined value of the smoothing parameter.

20 Claims, 4 Drawing Sheets

SMOOTHING PATHS IN A GRAPHICAL INTERFACE GENERATED BY DRAWING INPUTS

TECHNICAL FIELD

This disclosure relates generally to computer-implemented methods and systems and more particularly relates to smoothing paths in a graphical interface generated by drawing inputs.

BACKGROUND

Computing applications use drawing inputs to specify paths or shapes on a graphical interface. For example, a graphical interface may be displayed on a touch screen. A user may "draw" a line, a curve, or other path in the graphical interface by using a stylus or a finger to trace the path on the touch screen.

Such drawing inputs may imperfectly represent a desired path on the graphical interface. Defects in the path can include unwanted curves, lines, interruptions, or other unwanted features. The unwanted features can be caused by unintentional movement of the user's hand during a drawing input and/or due to noise introduced by the touch screen hardware.

It is desirable to decrease defects in a path generated by a drawing input caused by unintentional user movement during the drawing input and/or noise introduced by the input hardware.

SUMMARY

One embodiment involves determining a value of a motion attribute associated with a drawing input to a graphical interface. The embodiment also involves modifying a value of a smoothing parameter for a smoothing operation based on the determined value of the motion attribute. The smoothing parameter at least partially determines smoothing performed by a smoothing operation on input points generated by the drawing input. The embodiment also involves generating a path for rendering in the graphical interface. The path can be generated by applying the smoothing operation to the input points using the determined value of the smoothing parameter.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
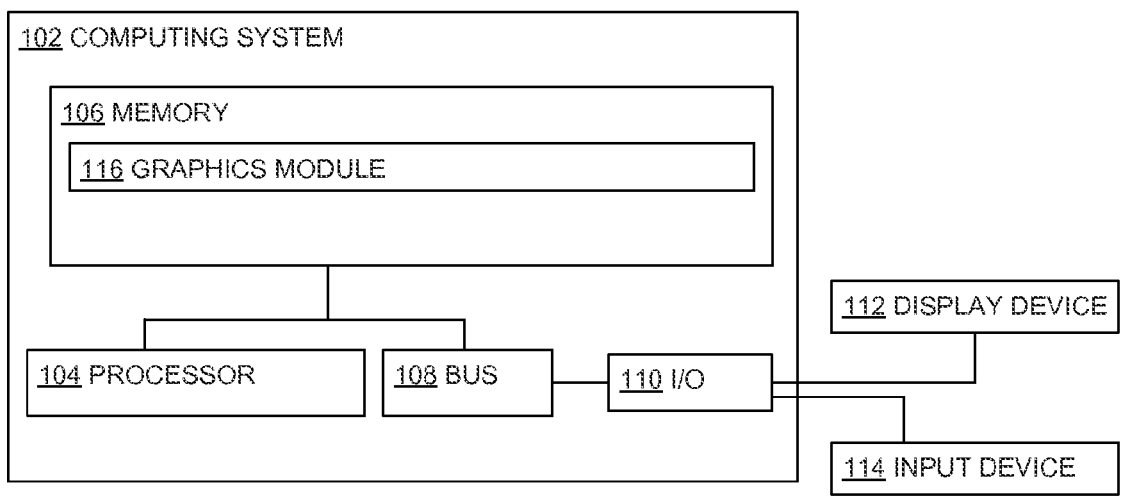
FIG. 1 is a block diagram depicting an example computing system for implementing certain embodiments.

Computer-implemented systems and methods are disclosed for smoothing paths in a graphical interface generated by drawing inputs.

The following non-limiting example is provided to help introduce the general subject matter of certain embodiments. A computing application can apply a smoothing operation to a drawing input. The smoothing operation can reduce or eliminate unwanted features in a path caused by unintentional movement of a user's hand during the drawing input. The computing application can determine that a greater amount of smoothing is desirable for rapid movements of a stylus and that a lower amount of smoothing is desirable for slower movements of the stylus. For example, a slowly drawn line may be more susceptible to defects caused by shaking of a user's hand than a quickly drawn line. The computing application can determine a speed associated with the drawing input (e.g., a speed at which a stylus moves across a touch screen). The computing application can modify a smoothing operation to provide higher amounts of smoothing for lower speeds and lower amounts of smoothing for higher speeds.

In accordance with one embodiment, a graphics module is provided for smoothing paths in a graphical interface generated by drawing inputs. The graphics module can determine a value of a motion attribute associated with a drawing input to a graphical interface. Non-limiting examples of a motion attribute include velocity of a drawing input, acceleration of a drawing input, curvature of the drawing input, etc. The graphics module can modify a value of a smoothing parameter for a smoothing operation based on the determined value of the motion attribute. The smoothing parameter at least partially determines an amount of smoothing performed by a smoothing operation on input points generated by the drawing input. For example, the graphics module may model a cursor as a mass being dragged in response to the drawing input. The amount of the mass can vary the amount of smoothing. The graphics module may increase the modeled mass value for lower velocities of the drawing input and may decrease the modeled mass value for higher velocities of the drawing input. The graphics module can generate a path to be rendered for display by the graphical interface. The path can be generated by applying the smoothing operation to the input points using the determined value of the smoothing parameter.

As used herein, the term "drawing input" is used to refer to a command to draw a line, curve, or other path in a graphical interface. A drawing input can be generated using any suitable input device such as (but not limited to), a touch screen, a touch pad, a mouse, etc.

As used herein, the term "motion attribute" is used to refer to an attribute of a physical motion with respect to an input device that generates the drawing input. Non-limiting examples of a motion attribute include the velocity or acceleration of the physical motion, a curvature of the motion, a pressure applied to an input device such as a touch screen during the motion, etc.

As used herein, the term "input point" is used to refer to a point along a path indicated by a drawing input. In one non-limiting example, a drawing input may be generated for a touch screen by capturing a series of images of a stylus or finger as the stylus or finger moves along a surface of the touch screen. Each image can be used to determine a respective input point identifying a respective position of the stylus or finger along the path indicated by the drawing input. In another non-limiting example, sensors on top of or beneath a touch surface or touch screen can detect pressure from a finger or stylus along the path indicated by the drawing input to generate the input points.

As used herein, the term "smoothing operation" is used to refer to an operation for modifying a path defined by the input points to generate a modified path to be rendered in a graphical interface. For example, a user may move a stylus along a horizontal axis for the purpose of drawing a line in the graphical interface. The motion of the stylus may include unintentional movements in a vertical direction caused by shaking of the user's hand. The path defined by the input points may thus include vertical spikes or curves rather than the flat horizontal line intended by the user. A smoothing operation can include modifying and/or removing one or more input points defining the vertical spikes or curves, thereby eliminating the unwanted features of the path caused by unintentional movements of the stylus.

As used herein, the term "smoothing parameter" is used to refer to any parameter that can modify an amount of smoothing performed by a smoothing operation. For example, a smoothing operation may modify or remove a given input point that deviates from a path by a given amount. A smoothing parameter can control the amount of deviation that causes the input point to be modified or removed.

As used herein, the term "output point" is used to refer to a point along a path to be rendered for display in a graphical interface in response to a drawing input. A group of output points defining the path to be rendered can be generated by applying a smoothing operation to the input points generated by a drawing input.

As used herein, the term "amount of smoothing" is used to refer to an amount by which a drawing input including multiple input points is modified to obtain a path including multiple output points. A greater amount of smoothing can include a greater portion of a drawing input being modified and/or a greater degree of modification to one or more portions of a drawing input. A smaller amount of smoothing can include a smaller portion of a drawing input being modified and/or a smaller degree of modification to one or more portions of a drawing input.

Referring now to the drawings, FIG. 1 is a block diagram depicting an example computing system 102 for implementing certain embodiments.

The computing system 102 can include a processor 104 that is communicatively coupled to a memory 106 and that executes computer-executable program instructions and/or accesses information stored in the memory 106. The processor 104 may comprise a microprocessor, an application-specific integrated circuit ("ASIC"), a state machine, or other processing device. The processor 104 can include any of a number of computer processing devices, including one. Such a processor can include or may be in communication with a computer-readable medium storing instructions that, when executed by the processor 104, cause the processor to perform the steps described herein.

The computing system 102 can also include a bus 108. The bus 108 can communicatively couple one or more components of the computing system 102.

The computing system 102 can also include and/or be communicatively coupled to a number of external or internal devices, such as input or output devices. For example, the computing system 102 is shown with an input/output ("I/O") interface 110, a display device 112, and an input device 114. Non-limiting examples of a display device 112 include a screen integrated with the computing system 102, a monitor external and coupled with the computing system, etc. Non-limiting examples of an input device 114 include a touch screen, a touch pad, an external mouse, etc. In some embodiments, the display device 112 and the input device 114 can be separate devices. In other embodiments, the display device 112 and the input device 114 can be integrated in the same device. For example, a display device 112 may be a screen and the input device 114 may be one or more components providing touch-screen functions for the display device, such as cameras for imaging a touch area or pressure sensors for detecting pressure changes caused by a touch.

The computing system 102 can modify, access, or otherwise use electronic content. The electronic content may be resident in any suitable computer-readable medium and execute on any suitable processor. In one embodiment, the electronic content can reside in the memory 106 at the computing system 102. In another embodiment, the electronic content can be accessed by the computing system 102 from a remote content provider via a data network.

The memory 106 can include any suitable computer-readable medium. A computer-readable medium may include, but is not limited to, electronic, optical, magnetic, or other storage device capable of providing a processor with computer-readable instructions or other program code. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

A graphics module 116 stored in the memory 106 can configure the processor 104 to prepare electronic content for rendering in a graphical interface and/or render the electronic content in the graphical interface. In some embodiments, the graphics module 116 can be a stand-alone application executed by the processor 104. In other embodiments, the graphics module 116 can be a software module included in or accessible by a separate application executed by the processor 104 that is configured to modify, access, or otherwise use the electronic content.

The computing system 102 can include any suitable computing device for executing the graphics module 116. Non-limiting examples of a computing device include a desktop computer, a tablet computer, a laptop computer, or any other computing device suitable for rendering the electronic content.

Figure 2:
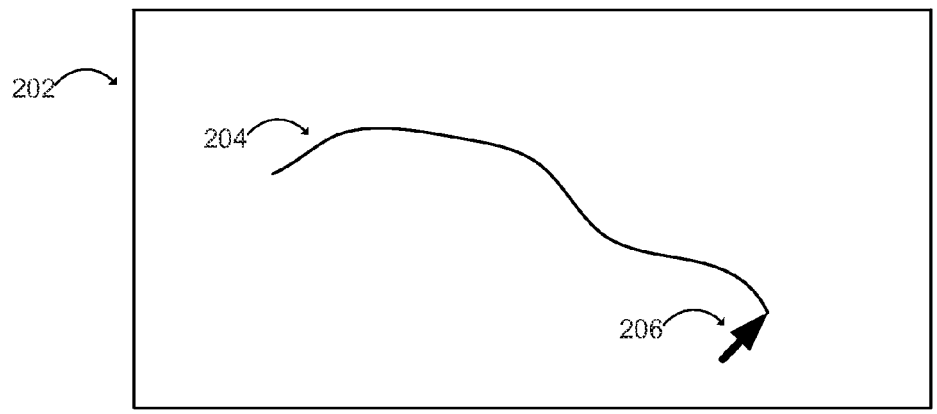
FIG. 2 is a modeling diagram depicting a drawing input to a graphical interface.

FIG. 2 is a modeling diagram depicting a drawing input 204 to a graphical interface 202. The graphical interface 202 can be rendered for display by the display device 112. The drawing input 204 can be provided to the computing system 102 via the input device 114. For example, the drawing input 204 can be generated by a finger or stylus moving along an input device 114 such as a touch screen or touch pad. In some embodiments, a cursor 206 can be rendered for display by the display device 112. The cursor 206 can visually depict the drawing input 204 received via the input device 114. In other embodiments, a cursor 206 can be omitted.

Figure 3:
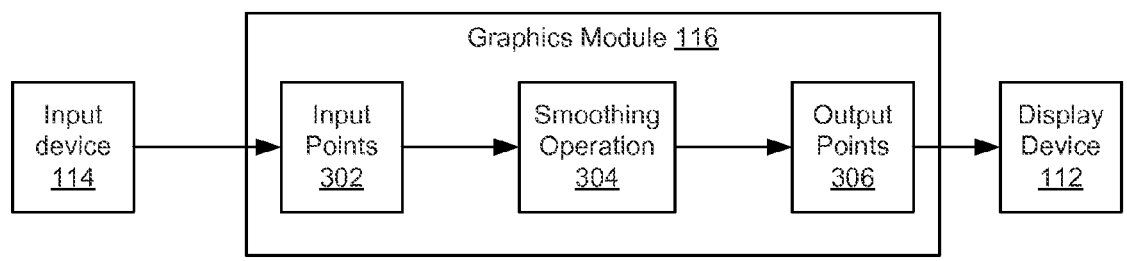
FIG. 3 is a modeling diagram depicting performance of a smoothing operation using input points obtained from a drawing input.
Figure 4:
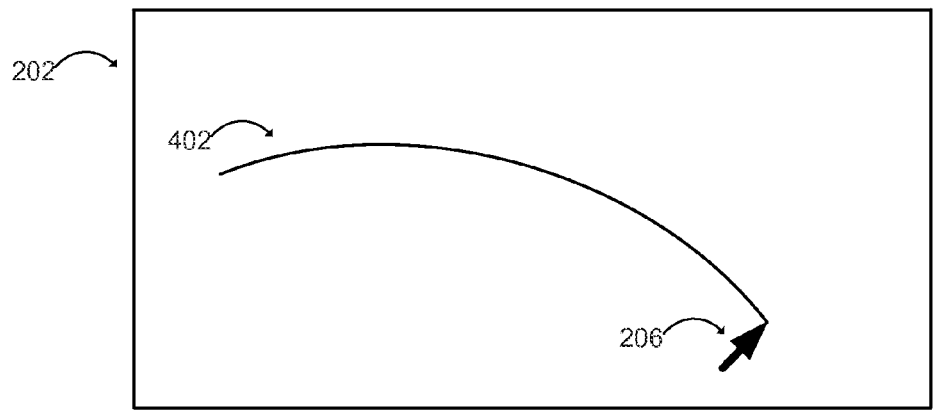
FIG. 4 is a modeling diagram depicting a path generated by the smoothing operation from the input points.

FIG. 3 is a modeling diagram depicting performance of a smoothing operation 304 using input points 302 obtained from a drawing input 204. The graphics module 116 can receive input points 302 from the input device 114. The input points 302 can include points along a path defined by the drawing input 204. The graphics module 116 can perform a smoothing operation 304 using the input points 302. The smoothing operation 304 can generate output points 306 from the input points 302. The output points 306 can be rendered in the graphical interface 202. For example, FIG. 4 is a modeling diagram depicting a path 402 generated by the smoothing operation 304 from the input points 302. The smooth path 402 can be defined by the output points 306.

In some embodiments, the smoothing operation 304 can involve modeling the cursor 206 as a physical object having a mass and modeling movement of the cursor 206 as a physical motion having a velocity. A modeled frictional force can resist the motion of the modeled physical object.

Figure 5:
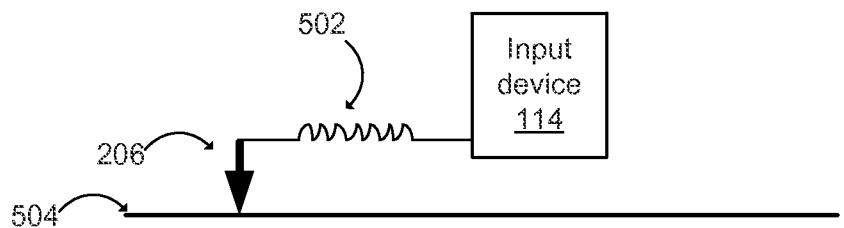
FIG. 5 is a modeling diagram depicting an example smoothing operation in which a cursor is modeled as a physical object dragged by an input device.

For example, FIG. 5 is a modeling diagram depicting an example smoothing operation 304 in which a cursor 206 is modeled as a physical object dragged by an input device 114. In a non-limiting example, a Dynadraw smoothing operation can model the cursor 206 as a physical object attached to the input device 114 by a spring 502 and moved along a surface 504 corresponding to the graphical interface 202.

The graphics module 116 can model the cursor 206 as a physical object by assigning a mass m to the cursor 206. The graphics module 116 can associate an amount of friction (or "drag") with a movement of the cursor 206 having the assigned mass m. The drag can be represented by a drag constant $c_{drag}$.

Modeling the cursor 206 as a physical object attached to a spring and having a mass and associated friction can allow the graphics module 116 to filter or otherwise ignore undesirable movements of an input device 114 during a drawing input 204. For example, in the absence of the modeled mass, friction, and spring 504, each movement of the input device 114 can be applied to the cursor 206. In the presence of the modeled mass, friction, and spring 504, a modeled resistive force generated by the modeled friction and mass and/or one or more modeled force associated with the spring 502 can reduce the effect of moving the input device 114 on the movement of the cursor 206. In one non-limiting example, a movement of the input device 114 may be sufficient to "extend" the modeled spring 502. The extension of the spring 502 can be modeled as exerting a force on the cursor 206. The modeled force F exerted on the cursor 206 can cause the cursor 206 having a modeled mass m to move toward a position of the input device 114 with an acceleration a based on the function F=ma. For a smaller modeled mass m, the acceleration a can be larger such that the cursor 206 tracks closely to the input device 114. For a larger modeled mass m, the acceleration a can be smaller such that the cursor 206 is less responsive to movement of the input device 114, thereby smoothing out those movements of the input device 114. In another non-limiting example, a modeled friction between with the cursor 206 and the model surface 504 can generate a modeled frictional force. The modeled frictional force can resist a modeled horizontal force applied to the cursor 206. The frictional force can be selected so as to limit oscillation around the input device 114 of the cursor 206 "attached" to the spring 502. The frictional force can prevent the spring 502 from causing the cursor 206 to accelerate such that the cursor 206 moves past the input device 114 and oscillates around the input device 114.

Figure 6:
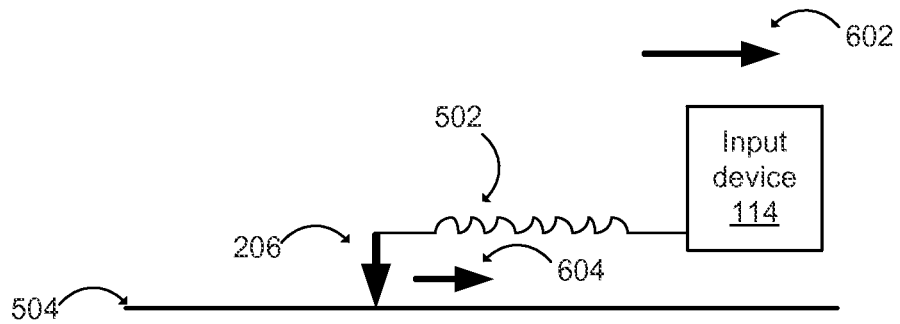
FIG. 6 is a modeling diagram depicting a movement of the input device causing a corresponding movement of the cursor.

A movement of the input device 114 sufficient to overcome a modeled resistive force generated by the drag constant $c_{drag}$ for a mass m can result in a movement of the cursor 206. For example, FIG. 6 is a modeling diagram depicting a movement 602 of the input device 114 causing a corresponding movement 604 of the cursor 206. The movement 602 can correspond to the drawing input 204 generated using the input device 114. The movement 602 of the input device 114 is modeled as applying a force through the spring 502 to the cursor 206. The modeled force can be proportional to the extension of the spring 502. The modeled force F acting on the cursor 206 can be the sum of the forces due to spring 502 extension and force associated with the drag constant $c_{drag}$. The acceleration of the cursor 206 in movement 604 can be determined by applying F=ma.

Figure 7:
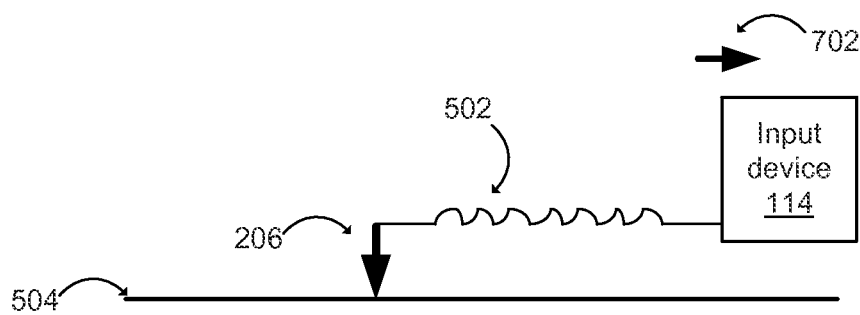
FIG. 7 is a modeling diagram depicting a movement of the input device that is insufficient to cause a movement of the cursor.

A movement with respect to the input device 114 may be insufficient to overcome an inertia associated with the cursor 206 having a modeled mass m. The inertia of the cursor 206 can be a function of the mass of the cursor 206. A higher mass can be associated with a higher inertia, thereby making the cursor less responsive to movements of the input device. The inertia can cause the graphics module 116 to filter out or otherwise ignore the movement with respect to the input device 114, thereby limiting movement of the cursor 206. For example, FIG. 7 is a modeling diagram depicting a movement 702 of the input device 114 that is insufficient to cause a movement of the cursor 206. The movement 702 can correspond to an undesirable movement with respect to the input device 114. In one non-limiting example, the movement 702 may be a small, rapid movement of the input device 114 that may occur due to noise in the input. The movement 702 being small can cause the modeled force applied to the cursor 206 to be correspondingly small. The movement 702 being rapid can cause the movement 702 to be applied for a short amount of time. The movement 702 being small and having a short duration can cause a correspondingly small acceleration to be applied to the cursor 206. A small acceleration being applied to the cursor 206 can limit the movement of cursor 206 in response to the movement 702. In another non-limiting example, an undesirable movement with respect to the input device 114 may be caused by a shaking of a user's hand while performing the movement that generates the drawing input 204. The graphics module 116 can determine that the movement 702 is sufficiently small that a modeled force generated by the movement 702 is insufficient to overcome an inertia associated with the cursor 206. The inertia resists movement of the cursor 206 and thereby limit movement of the cursor 206. Limiting movement of the cursor 206 in response to the undesirable movement 702 can smooth a path 402 generated in response to the drawing input 204.

The path 402 can be defined by the output points 306. The graphics module 116 can generate n output points 306 based on the input points 302. For a given output point $p_{out,n}$, the graphics module 116 can determine a model force F associated with the movement of the cursor 206 based on the function $$F = k(p_{in} - p_{out,n-1}),$$

where $p_{in}$ represents the received input position, $p_{out,n-1}$ represents a recent filtered output point, and k is a constant describing the strength of the spring 502. The function can be simplified by using k=1, which can effectively consolidate the spring constant with the mass m and drag constant. A filtered output point can be one of the output points 306 defining the smooth path 402 and generated by filtering or otherwise modifying one or more of the input points 302. The graphics module 116 can select a time value of t=1 to simplify the function above to obtain the function $$F=p_{in}-p_{out,n-1}.$$

The graphics module 116 can determine a model acceleration a associated with the model force F and the assigned mass m based on the function $$a = \frac{F}{m}.$$

An initial velocity $v_0$ of the drawing input 204 can be updated based on the acceleration a. An updated velocity $v_1$ can be determined from the function $$v_1=v_0+at.$$

The graphics module 116 can select a time value of t=1 to simplify the function above to obtain the function $$v_1=v_0+a$$

The velocity $v_1$ can be further updated based on the drag factor to have a velocity $v_2$ as determined by the function $$v_2=v_1 \times c_{drag}.$$

The output point $p_{out,n}$ can be determined from the recent output point $p_{out,n-1}$ based on the function $$p_{out,n}=p_{out,n-1}+v_2 t.$$

The graphics module 116 can select a time value of t=1 to simplify the function above to obtain the function $$p_{out,n}=p_{out,n-1}+v_2 t.$$

In some embodiments, a Dynadraw smoothing operation as described above or other similar smoothing operation can generate an inexact estimate for one or more of the points $p_{out,n}$. The inexact estimate can result from using an assigned drag constant. The value of the drag constant can control an amount of oscillation in the path 402. The oscillation can be generated by modeling the cursor 206 as a mass attached to a spring. Different values of the drag constant can result in different oscillation values. The value of the drag constant can also control an amount of overshoot or undershoot in the output points 306 generated by the smoothing operation 304. Incorrect or sub-optimal selection of the drag constant value can result in the output points 306 defining a path 402 having reduced fidelity to the desired path indicated by the drawing input 204.

Deficiencies of the Dynadraw process or other similar process can be remedied by improving tuning of a drag factor and providing a more accurate simulation of the mass spring system to improve the smoothness of the output points 306.

In some embodiments, the output points 306 can be generated with greater fidelity to the desired path by applying a smoothing operation 304 without a drag constant having a set value. For example, the graphics module 116 can model a path between each of the input points 302 as a straight line. Modeling a path between each of the input points 302 as a straight line can allow the graphics module 116 to generate the output points 306 using a differential equation using the position of the drawing input 204, as described below.

For example, a path including the output points 306 can be determined from the function p(t). An output path p(t) can be determined by solving the following differential equation for p(t):

$$p''(t)+\gamma p'(t)+p(t)=p_{in,n-1}+Dt$$

The p''(t) is a second derivative of the function (p)(t) and p'(t) is a first derivative of the function (p)(t). The point $p_{in,n-1}$ is a prior un-smoothed input point. A distance D between an input point $p_{in}$ and a prior un-smoothed input point $p_{in,n-1}$ can be represented by the function $D=p_{in}-p_{in,n-1}$ The graphics module 116 can automatically determine a drag factor γ based on the mass factor m using the function $$\gamma = 2\sqrt{m}.$$

The drag factor γ can minimize oscillation and/or overshoot/undershoot of the cursor 206 with respect to the input device 114.

For a time value of 1, the graphics module 116 can determine the term dp'(t) from the velocity v at which the output point is moving, as represented by the function $$v = \frac{dp}{dt} = (xr + y(1+rt))e^{rt} + D,$$

where $$r = \frac{-1}{\sqrt{m}}$$

$$x = (p_{out,n-1} - p_{in,n-1}) + \gamma D, \text{ and}$$

$$y = v_{out} - D - xr$$

for a previously determined output point $p_{out,n-1}$ and a prior input point $p_{in,n-1}$, where $v_{out}$ is a velocity corresponding to $p_{out,n-1}$.

The graphics module 116 can determine the solution for the differential equation above to obtain an output point p for a received input point $p_{in}$ at time t=1. The output point can be represented by the function $$p(t)=(x+yt)e^{rt}+z,$$

where $$z=p+D(t-\gamma).$$

The graphics module 116 can thereby obtain a function p(t) for a smooth path 402 based on the input points $p_{in}$ and $p_{in,n-1}$ (which are determinative of distance D), a previously determined output point $p_{out,n-1}$ and the velocity $v_{out}$ for the previously determined output point $p_{out,n-1}$, and the mass factor m (which is determinative of r and drag factor γ).

In some embodiments, the graphics module 116 can vary the amount of smoothing applied to different input points 302. For example, for drawing inputs having a lower velocity v, a larger mass factor can be desirable. A larger mass factor m can produce a smooth result for drawing inputs having a lower velocity v. A potential disadvantage of increasing the mass factor m can be increasing the distance (or lag) between the current input position and the corresponding rendered output position. An excessive lag may be sufficiently long that a user can perceive the lag, thereby decreasing a quality of the user's experience. In another example, for drawing inputs having a higher velocity v, a lower amount of smoothing can be desirable. The higher velocity may reduce the effects of noise or other undesirable motion of the cursor 206. Decreasing the mass factor at higher velocities can reduce the lag without adversely affecting the smoothness of the output path 402.

In some embodiments, the graphics module 116 can vary the mass factor m based on one or more motion attributes of the motion of the drawing input. Non-limiting examples of motion attributes include the velocity and acceleration of the motion of the drawing input. For example, the value of the mass factor m can be decreased as the velocity v increases and increased as the velocity v decreases. Varying the mass m based on the velocity v or other motion attribute can modify the amount of smoothing performed by the smoothing operation 304. Modifying the amount of smoothing performed by the smoothing operation 304 can provide a smooth output path 402 having reduced or minimal lag for a range of drawing speeds.

In a non-limiting example, the graphics module 116 can vary the mass factor m as a function of the velocity v of the drawing input. The variable mass factor m can be represented by the function:

$$m = \frac{m_0}{w(m_0/m_1 - 1) + 1}.$$

The parameter w can be represented by the function $$w = \frac{(v - v_0)}{(v_1 - v_0)}$$

where $v_0$ represents a minimum velocity, $v_1$ represent as maximum velocity, $m_0$ represents a mass factor value for use with the minimum velocity $v_0$, and $m_1$ represents a mass factor value for use with the maximum velocity $v_1$. The variable mass m can be used to determine an output point $p_{out,n}$ using the function $p_{out,n} = (a+bt)e^{rt} + c$, as described above. The maximum velocity $v_1$ and minimum velocity $v_0$ can vary based on characteristics of the input device 114 and can be selected experimentally in order to produce a suitably smooth output and a reduced or minimal lag.

Figure 8:
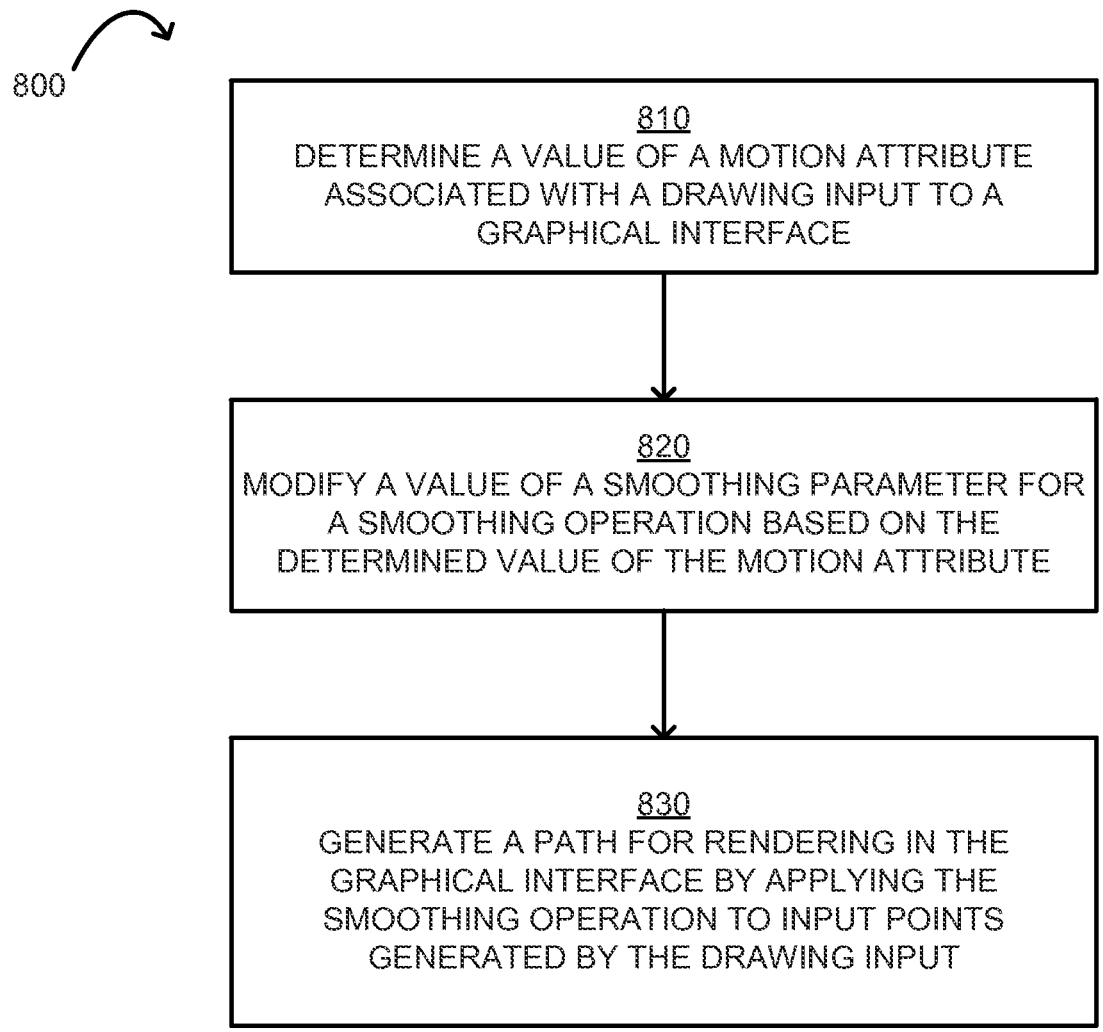
FIG. 8 is a flow chart illustrating an example method for smoothing paths in a graphical interface generated by drawing inputs.

FIG. 8 is a flow chart illustrating an example method 800 for smoothing paths in a graphical interface generated by drawing inputs. For illustrative purposes, the method 800 is described with reference to the system implementation depicted in FIG. 2 and the operations described with respect to FIGS. 3-7. Other implementations, however, are possible.

The method 800 involves determining a value of a motion attribute associated with a drawing input to a graphical interface, as shown in block 810. The processor 104 of the computing system 102 can execute the graphics module 116 or other suitable programming instructions to determine the value of the motion attribute associated with a drawing input 204 to a graphical interface 202.

In some embodiments, a motion attribute can be associated with a speed of the drawing input 204, such as (but not limited to) the velocity and/or the acceleration of the drawing input 204. The processor 104 can execute the graphics module 116 or other suitable programming instructions to determine the velocity and/or acceleration. Determining the velocity and/or acceleration associated with the drawing input 204 may involve associating a time value with each of the input points 302 identifying when the input point was generated by the input device 114. In one non-limiting example, the processor 104 can determine the velocity based on the total distance of the drawing input and the duration of the drawing input. The processor 104 can determine a distance between the first received point and the last received point of the input points 302. The processor 104 can determine a duration of the drawing input 204 from a difference between the time values for the first received point and the last received point. The processor 104 can determine a velocity for the drawing input 304 based on the determined distance and duration associated with the drawing input 304. In another non-limiting example, the processor 104 can determine a velocity at each of the input points 302 based on a distance between sequential pairs or groups of the input points 302 and the difference in time values between the sequential pairs or groups. The processor 104 can determine an acceleration at each of the input points 302 based on changes in the determined velocity between sequential pairs of the input points 302.

In additional or alternative embodiments, a motion attribute can be a curvature associated with the drawing input 204. For example, the processor 104 can determine that the drawing input 204 generally defines a straight line, a curve, or other shapes. For example, the mass can be increased in regions of high local curvature that may correspond to a noisy part of the input. The graphics module 116 can estimate a discrete curvature of the drawing input 204. For example given 3 input points A, O, B, an estimate of curvature can be $$k = 4S/(abc)$$

where S is the area of the triangle AOB and a, b, c are the distances AO, OB and BC respectively.

In additional or alternative embodiments, a motion attribute can be a pressure associated with one or more of the input points 302 generated by the drawing input 204. For example, an input device 114 may be a touch device, such as a touch screen or touch pad, that can detect an amount of pressure applied by a finger or stylus to a touch surface.

In some embodiments, the drawing input 204 can be received in a two-dimensional plane. In other embodiments, the drawing input 204 can be received in a three-dimensional space. The input device 114 can include one or more devices that can image a three-dimensional space and capture the position of a stylus, finger, or other object in the three-dimensional space. The processor 104 can determine the motion attribute based on the positions of each of the input points 302 in the three-dimensional space.

The method 800 further involves modifying a value of a smoothing parameter for a smoothing operation based on the determined value of the motion attribute, as shown in block 820. The processor 104 of the computing system 102 can execute the graphics module 116 or other suitable programming instructions to modify the value of a smoothing parameter for a smoothing operation 304 based on the determined value of the motion attribute, as described above with respect to FIGS. 5-7.

The smoothing parameter can at least partially determine an amount of smoothing performed by the smoothing operation 304. In some embodiments, the smoothing parameter can be a variable mass factor for the cursor 206. In other embodiments, the smoothing parameter can be a variable drag factor for the cursor 206. In one non-limiting example, the drag factor can be increased at higher velocities. Increasing the drag factor can accentuate curves in the input stream. At lower velocities, the drag factor can remain constant or be decreased to prevent accentuating noise and wobbles in the input, which may be undesirable. The same formula can be used to vary the drag factor as for varying the mass factor by substituting drag factor for the mass factor in the formula.

In one non-limiting example, a smoothing parameter such as variable mass factor m can be varied based on a motion parameter such as a velocity according to the function $$m = \frac{m_0}{w(m_0/m_1 - 1) + 1},$$

as described above.

In another non-limiting example, a smoothing parameter such as a variable mass factor can be varied based on a motion parameter such as a pressure associated with one or more of the input points 302. An increased pressure can indicate that less smoothing is required and a decreased pressure can indicate that more smoothing is required. The graphics module 116 can decrease the value of the mass factor based on an increase in pressure and can increase the value of the mass factor based on a decrease in pressure. The graphics module 116 can use same formula as used as for varying mass with velocity by substituting pressure values for the velocity.

The method 800 further involves generating a path for rendering in the graphical interface by applying the smoothing operation to the plurality of input points using the determined value of the smoothing parameter, as shown in block 830. The processor 104 of the computing system 102 can execute the graphics module 116 or other suitable programming instructions to generate a path 402 for rendering in the graphical interface 202 by applying the smoothing operation 304 to the input points 302, as described above with respect to FIGS. 3-7.

In some embodiments, the graphics module 116 can determine the output points 306 defining a path 402 by using a differential equation that describes relationships among the position, velocity and acceleration of the output, an assigned mass factor for the cursor 206, and one or more of the input points 302. The graphics module 116 can assign a variable mass factor to the cursor 206, as described above. The graphics module 116 can determine the acceleration and velocity of the drawing input 204 based on the input points 302, as described above with respect to block 810. The graphics module 116 can determine a differential equation relating the velocity, the acceleration, the mass factor, and the input points 302. The graphics module 116 can determine each of the output points 306 by solving the differential equation, as described above.

In other embodiments, a Dynadraw process or other suitable smoothing operation can be used to generate the path 402. The graphics module 116 can assign a mass factor and a drag factor to a cursor 206 used to indicate the drawing input, as described above with respect to FIGS. 5-7. The graphics module 116 can determine a model force associated with a movement of the cursor 206 by the drawing input 204. The model force can be determined based on the mass factor, the drag factor, and the input points 302 of the drawing input 204. The graphics module 116 can generate the output points based on an acceleration associated with the model force and the drag factor. The graphics module 116 can modify at least one of the mass factor and the drag factor based on one or more motion attributes of the drawing input.

In additional or alternative embodiments, the graphics module 116 can modify a smoothing parameter (e.g., a variable mass factor) during the drawing input 204 based on detecting differences in the motion attribute (e.g., differences in velocity) during different portions of the drawing input 204. For example, the graphics module 116 can determine a first value of the motion attribute for a first portion of the drawing input 204 (e.g., a first velocity) and a second value of the motion attribute for a second portion of the drawing input 204 (e.g., a second velocity greater than or less than the first velocity). The graphics module 116 can select first and second values for a smoothing parameter (e.g., assign first and second values to a mass factor) based on the respective first and second values of the motion attribute during first and second portions of the drawing input 204. The graphics module 116 can apply a first amount of smoothing to the first portion of the drawing input 204 based on the first value of the smoothing parameter. The graphics module 116 can apply a second amount of smoothing greater than or less than the first amount of smoothing to the second portion of the drawing input 204 based on the second value of the smoothing parameter.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
    assigning a model mass to a cursor used to indicate a drawing input to a graphical interface, wherein the drawing input generates a plurality of input points defining an un-rendered first path;
    determining a value of a motion attribute associated with the drawing input;
    modifying, based on the determined value of the motion attribute, a drag factor representing a friction associated with moving the cursor having the model mass along the first path, wherein the drag factor at least partially determines smoothing performed by a smoothing operation on the plurality of input points generated by the drawing input; and
    generating a second path for rendering in the graphical interface by applying the smoothing operation to the un-rendered first path using the modified drag factor, wherein applying the smoothing operation to the first path comprises removing or changing at least some of the plurality of input points to generate a plurality of output points defining the second path.

2. The method of claim 1, wherein applying the smoothing operation further comprises generating each point of the plurality of output points defining the second path based on a differential equation relating sequential pairs of input points to the model mass, a position of the drawing input, a velocity associated with the output points, and an acceleration associated with the output points.

3. The method of claim 2, wherein the motion attribute comprises the velocity.

4. The method of claim 1, wherein the smoothing operation further comprises:
    modifying the model mass based on the determined value of the motion attribute;
    determining a model force associated with a movement of the cursor by the drawing input, wherein the model force is determined based on the modified model mass, the modified drag factor, and the drawing input; and
    generating each point of the plurality of output points defining the second path based on the model force.

5. The method of claim 1,
    wherein determining the value of the motion attribute comprises determining a first value of the motion attribute for a first portion of the drawing input and a second value of the motion attribute for a second portion of the drawing input, wherein the first and second values of the motion attribute are different;
    wherein modifying the drag factor comprises selecting a first value of the drag factor for the first portion of the drawing input based on the first value of the motion attribute and selecting a second value of the drag factor for the second portion of the drawing input based on the second value of the motion attribute, wherein the first and second values of the drag factor are different;
    wherein generating the second path comprises applying the smoothing operation to a first portion of the plurality of input points using the determined first value of the drag factor and applying the smoothing operation to a second portion of the plurality of input points using the determined second value of the drag factor.

6. The method of claim 1, wherein the motion attribute comprises a velocity of the drawing input.

7. The method of claim 1, wherein the motion attribute comprises an acceleration of the drawing input.

8. The method of claim 1, wherein the motion attribute comprises a curvature of the drawing input.

9. The method of claim 1, wherein the motion attribute comprises a respective pressure associated with each of the plurality of input points.

10. A non-transitory computer-readable medium embodying program code executable by a processing device, the non-transitory computer-readable medium comprising:
    program code for assigning a model mass to a cursor used to indicate a drawing input to a graphical interface, wherein the drawing input generates a plurality of input points defining an un-rendered first path;
    program code for determining a value of a motion attribute associated with the drawing input;
    program code for modifying, based on the determined value of the motion attribute, a drag factor representing a friction associated with moving the cursor having the model mass along the first path, wherein the drag factor at least partially determines smoothing performed by a smoothing operation on the plurality of input points generated by the drawing input; and
    program code for generating a second path for rendering in the graphical interface by applying the smoothing operation to the un-rendered first path using the modified drag factor, wherein applying the smoothing operation to the first path comprises removing or changing at least some of the plurality of input points to generate a plurality of output points defining the second path.

11. The non-transitory computer-readable medium of claim 10, wherein applying the smoothing operation further comprises generating each point of the plurality of output points defining the second path based on a differential equation relating sequential pairs of input points to the model mass, a position of the drawing input, a velocity associated with the output points, and an acceleration associated with the output points.

12. The non-transitory computer-readable medium of claim 11, wherein the motion attribute comprises the velocity.

13. The non-transitory computer-readable medium of claim 10, wherein the smoothing operation further comprises:
    modifying the model mass based on the determined value of the motion attribute;
    determining a model force associated with a movement of the cursor by the drawing input, wherein the model force is determined based on the modified model mass, the modified drag factor, and the drawing input; and
    generating each point of the plurality of output points defining the second path based on the model force.

14. The non-transitory computer-readable medium of claim 10,
    wherein determining the value of the motion attribute comprises determining a first value of the motion attribute for a first portion of the drawing input and a second value of the motion attribute for a second portion of the drawing input, wherein the first and second values of the motion attribute are different;
    wherein modifying the drag factor comprises selecting a first value of the drag factor for the first portion of the drawing input based on the first value of the motion attribute and selecting a second value of the drag factor for the second portion of the drawing input based on the second value of the motion attribute, wherein the first and second values of the drag factor are different;
    wherein generating the second path comprises applying the smoothing operation to a first portion of the plurality of input points using the determined first value of the drag factor and applying the smoothing operation to a second portion of the plurality of input points using the determined second value of the drag factor.

15. The non-transitory computer-readable medium of claim 10, wherein the motion attribute comprises a velocity of the drawing input.

16. The non-transitory computer-readable medium of claim 10, wherein the motion attribute comprises an acceleration of the drawing input.

17. The non-transitory computer-readable medium of claim 10, wherein the motion attribute comprises a curvature of the drawing input.

18. The non-transitory computer-readable medium of claim 10, wherein the motion attribute comprises a respective pressure associated with each of the plurality of input points.

19. A system comprising:
   an input device;
   a processor communicatively coupled to the input device and configured to generate a drawing input in response to a movement with respect to the input device; and
   a non-transitory computer-readable medium communicatively coupled to the processor;
   wherein the processor is configured for executing program code embodied in the non-transitory computer-readable medium to perform operations comprising:
      assigning a model mass to a cursor used to indicate the drawing input to a graphical interface, wherein the drawing input generates a plurality of input points defining an un-rendered first path,
      determining a value of a motion attribute associated with the drawing input,
      modifying, based on the determined value of the motion attribute, a drag factor representing a friction associated with moving the cursor having the model mass along the first path, wherein the drag factor at least partially determines smoothing performed by a smoothing operation on the plurality of input points generated by the drawing input, and
      generating a second path for rendering in the graphical interface by applying the smoothing operation to the un-rendered first path using the modified drag factor, wherein applying the smoothing operation to the first path comprises removing or changing at least some of the plurality of input points to generate a plurality of output points defining the second path.

20. The system of claim 19, wherein the input device comprises at least one of a touch screen, a mouse, and a touch pad.

* * * * *